INVENTOR.
GEORGE N. LILES
BY
AGENT

March 3, 1970 G. N. LILES 3,498,428
LOW POWER OPERATED CLUTCH LATCHING MECHANISM
Filed Oct. 19, 1967 4 Sheets-Sheet 2

INVENTOR.
GEORGE N. LILES
BY
AGENT

March 3, 1970 G. N. LILES 3,498,428
LOW POWER OPERATED CLUTCH LATCHING MECHANISM
Filed Oct. 19, 1967 4 Sheets-Sheet 3

INVENTOR.
GEORGE N. LILES
BY
AGENT

March 3, 1970  G. N. LILES  3,498,428
LOW POWER OPERATED CLUTCH LATCHING MECHANISM
Filed Oct. 19, 1967  4 Sheets-Sheet 4

INVENTOR.
GEORGE N. LILES
BY
AGENT

United States Patent Office 3,498,428
Patented Mar. 3, 1970

3,498,428
LOW POWER OPERATED CLUTCH LATCHING MECHANISM
George N. Liles, Southfield, Mich., assignor to Burroughs Corporation, Detroit, Mich., a corporation of Michigan
Filed Oct. 19, 1967, Ser. No. 676,443
Int. Cl. F16d *11/00, 13/04*
U.S. Cl. 192—28                                         4 Claims

ABSTRACT OF THE DISCLOSURE

A small, compact clutch latching mechanism selectively controlled by a low power solenoid and a continually rotating cam. The latching mechanism is pivotable into and out of the path of movement of a clutch mechanism to effect disengagement and engagement of the clutch. A solenoid mounted on the latching mechanism pivots a cam follower into the path of the continually rotating cam. The cam acting on the low inertia clapper of the solenoid as a lever, pivots the entire latching mechanism out of the path of the clutch mechanism thereby allowing the clutch to engage. A cam face knock-off removes the cam follower from the cam.

BACKGROUND OF THE INVENTION

In modern business machines, it is often necessary to clutch and declutch many mechanisms in response to electrical pulses. One such mechanism is a printer which is required to cycle and print the desired information obtained from an electronic computer in response to a signal from the computer. Previously, a large, heavy-duty solenoid was needed to initiate a clutching operation. The solenoid had to be large and powerful because it was required to lift the latching mechanism against the torque of the clutch. To help reduce the power expended and the heat generated thereby, which caused mechanism failures, the unlatching motion was held to a minimum. The resulting close tolerances produced problems in the manufacture and operation of the moving parts.

Another criterion of the modern business machine is that its internal mechanisms must be started and stopped quickly and at a particular angular position of the driving member. Several parts of the machine are clutched and declutched on only particular cycles of the main drive shaft such as the tabulation of a carriage at a particular degree of rotation of the main drive. At the low cycling speeds of mechanical accounting machines, a simple friction clutch was sufficient. The cycle time of the machines was long enough to allow time for clutching variations. Present day high speed business machines, however, cannot allow for these time variations and require that the engagement of the clutch be accurately timed. Precise timing has also been difficult because of the variations in electrical and mechanical factors such as the supply voltage, the temperature of the electromagnet, and the angular torque of the clutch mechanism on the control arm. Attempts have been made at obtaining timing accuracy, as previously stated, by the use of oversize solenoids to lift the latching mechanism against the torque of the clutch as quickly as possible. Other attempts employed minimum unlatching movement with the result that the small unlatching motions required close tolerances on the parts of the clutch to keep the angular forces low. A bulky machine component resulted from an assembly containing the oversize solenoid, and an unreliable machine component resulted from the tight machining and assembly tolerances necessary in order to keep the unlatching motion at a minimum.

SUMMARY OF THE INVENTION

It is, therefore, an object of this invention to provide a simple and inexpensive mechanism requiring few parts for reliably activating a clutch.

It is another object of this invention to provide an improved high-speed latching mechanism, utilizing low power, to control the engagement and disengagement of a mechanically coupled clutch.

It is another object of this invention to provide an apparatus for synchronizing the clutching operation with respect to the drive member although the actuation of the mechanism may vary over a large time interval.

In accomplishing these and other objectives, applicant's invention comprises a rotatable clutch control means coaxially mounted with a continuously rotating unlatching cam. A clutch latching or actuator assembly is pivotally mounted for movement into and out of the path of the clutch control means. The latching assembly is normally biased into the circular path of the control means. A low inertia actuator control arm is pivotally mounted to the assembly. A cam follower is mounted on one end of the arm adjacent to the continuously rotating unlatching cam. A small light weight source of power, such as a solenoid, is carried by the latching mechanism for urging said cam follower into the path of the continuously rotating unlatching cam. The actuator control arm is utilized as a lever to pivot the latching mechanism out of the path of the clutch control means and allow the clutching mechanism to engage. A projection, a cam face knock-off, is provided on the unlatching cam to remove said cam follower from the path of said unlatching cam.

BRIEF DESCRIPTION OF THE DRAWINGS

The novel features of the invention, as well as the invention itself, both as to its organization and method of operation, will best be understood from the following description when read in connection with the accompanying drawings in which.

DESCRIPTION OF A PREFERRED EMBODIMENT

Figure 1:
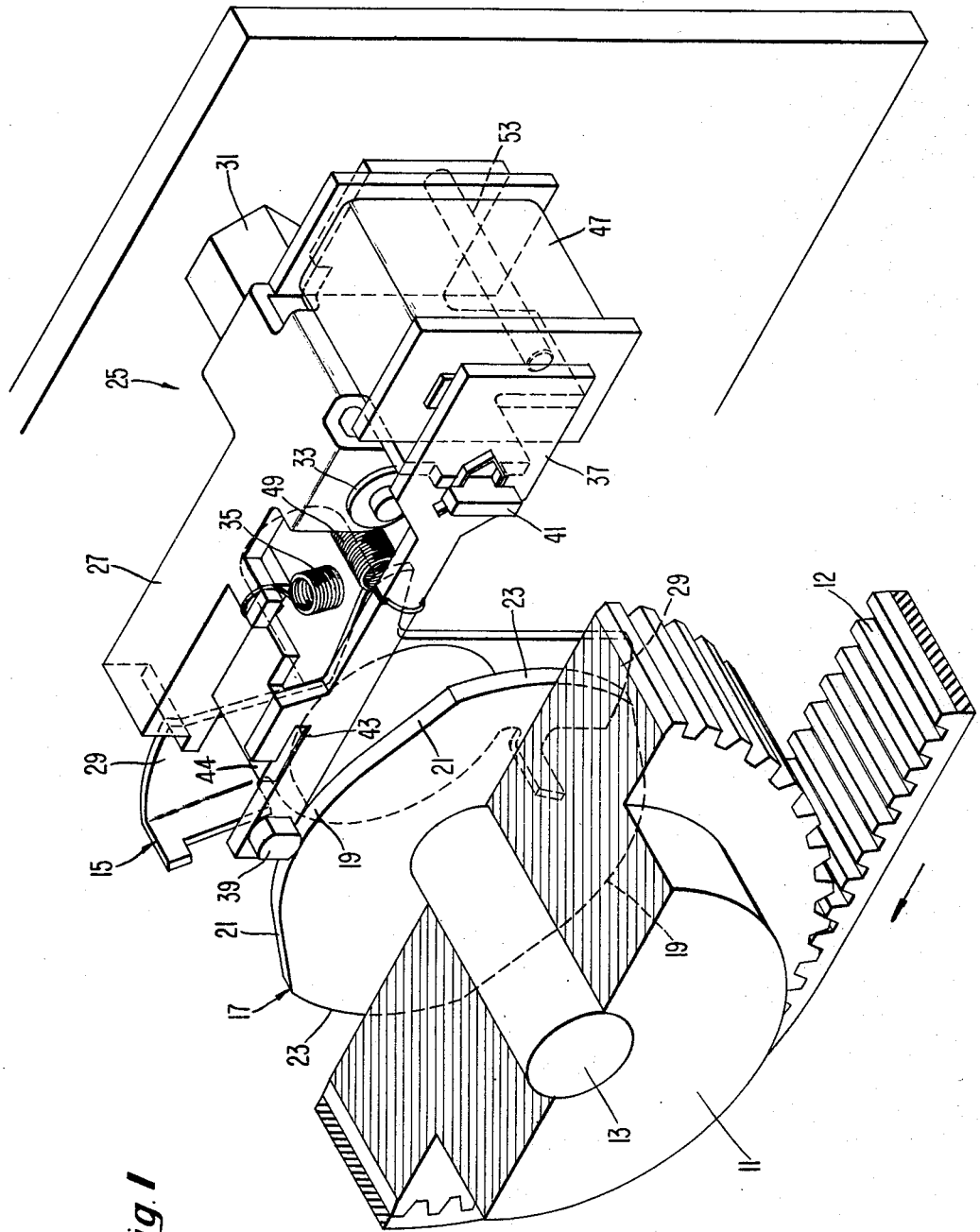
FIG. 1 is a perspective view of a latching mechanism embodying this invention.

In the illustrated embodiment, the invention is shown as incorporated in a clutch assembly comprising a drive member normally continuously rotated about an axis and a driven member which, under the control of a latching mechanism, is intermittently driven from the drive member. Referring to the drawings, and particularly FIG. 1, the embodiment in general comprises a drive member 11 represented herein by a drive pulley which is driven by a timing belt, 12. The drive pulley 11 is rotatable about an axis represented by a shaft 13 which in the illustrated embodiment is the driven member. A second intermittently rotatable member 15 serves as a clutch control which when held from rotation disengages the clutch parts and when allowed to rotate will cause engagement of these parts. Continuously rotatable jointly with the pulley 11 is a cam 17 containing cam surfaces 19 formed by lobes 23 having increasing radii 21. The latching mechanism generally indicated at 25 is capable of entering the path of movement of the clutch control member 15 and thereby holding the latter from rotation.

With further reference to FIG. 1, the latching mechanism is supported for movement such that it may carry a stop member 27 into and out of the path of movement of projection 29 of control member 15 thereby effecting disengagement and engagement of the clutch parts. Movement of the latching mechanism between the disengaged and engaged positions is accomplished by a pivot post 31 about which the latching mechanism is rockingly supported. The axis of pivot post 31 is parallel to the axis of rotation of the clutch. A suitable pivotable mounting is obtained by providing two depending ears on the stop member 27 which embrace the post. Clip 33 retains the stop member in position on the pivot post 31. Biasing means, such as spring 35, urges the stop member 27 into the path of the clutch control mechanism 15.

In order to rock the latching mechanism into the engaged position of control, an arm 37 carrying a cam follower 39 is suitably fastened to the latching mechanism such as at pivot point 41 and notch 43. A projection 44 on the side of stop member 27 overlies the arm 37 and is slidably engaged with the notch 43. When the follower 39 is moved into the plane of the continually rotating cam and engages the lobes 23 thereon the cam 37 will act as a lever and, the latchng mechanism will be pivoted clockwise, as viewed in FIG. 1, about the post to clear the stop member from the projection 29 of the intermittently operable control member 15 thus engaging the clutch. Movement of the arm 37 is obtained from a low powered source of electrical motive power carried by the latching mechanism and forming a part thereof. This motive power is illustrated in the form of a solenoid 47 mounted on the outer end of the latching mechanism remote to the stop member. The outer end of the arm 37 overlying the end of the coil of the solenoid functions as an armature or clapper. It is evident that when the solenoid 47 is energized, it will pivot the clapper arm 37, thereby swinging the other end of the arm and the cam follower roller into engagement with the cam 17.

As described above, applicant's invention comprises a latching mechanism containing few parts and small parts, all of which are carried on the single rockable support. Even with these small and few parts, the motive power represented by the solenoid 47 does not supply the force necessary to unlatch the mechanism, rather the main driving force itself supplies the power. The solenoid controls only a small mass thereby providing for fast response and complete control of a large torque, all by a power source carried on the latching mechanism.

Referring again to FIG. 1, the mechanism is displayed in the position immediately before the unlatching cam is to release the clutch control member 15. The actuator control arm 37 is shown energized by the electromagnet 47 thereby placing cam follower 39 in position for contacting the cam 17. As noted before, cam 17 is normally continually rotating as a part of drive pulley 11. As the unlatching cam rotates, the increasing cam radius 21 will pivot the entire latching mechanism clockwise out of the path of projection 29 thereby activating the clutch mechanism.

Figure 4:
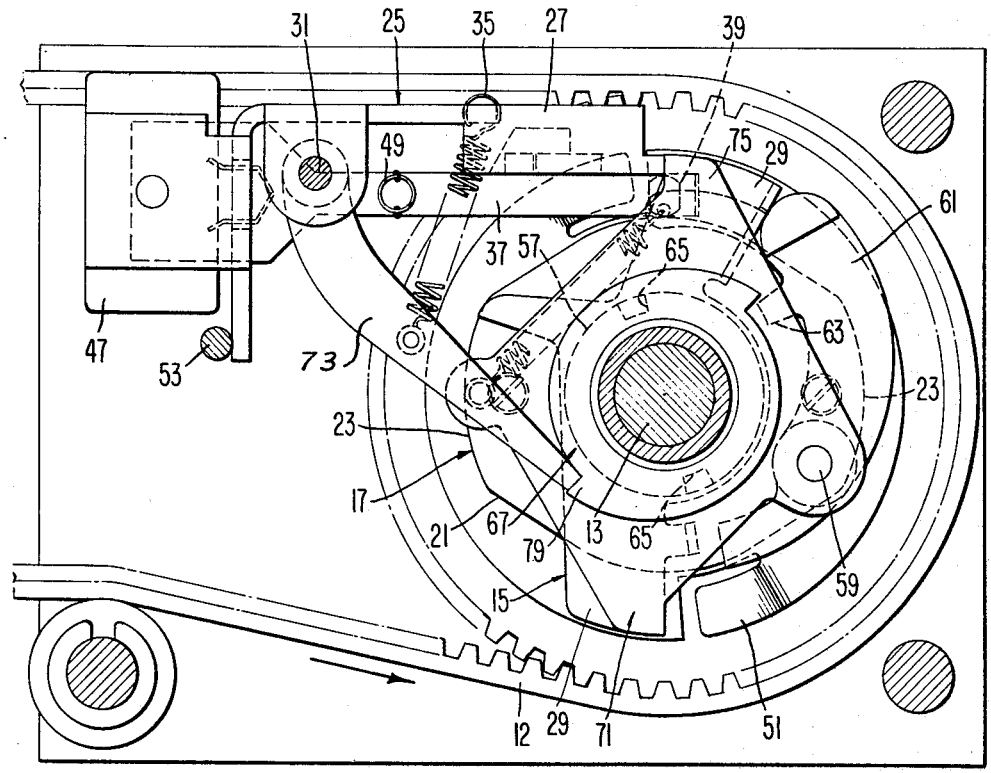
FIG. 4 is a sectional view taken along lines 4—4 of FIG. 3.
Figure 5:
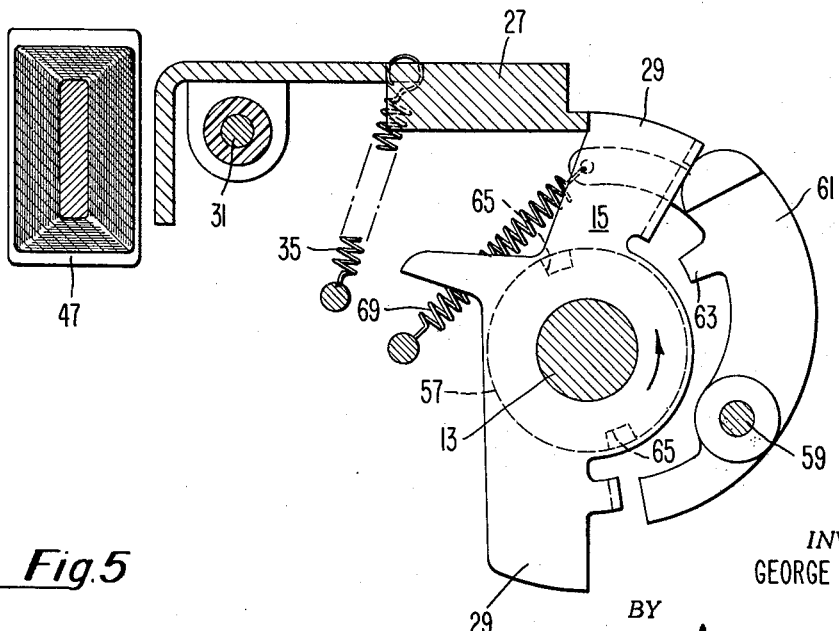
FIG. 5 is a sectional view taken along lines 5—5 of FIG. 3.
Figure 6:
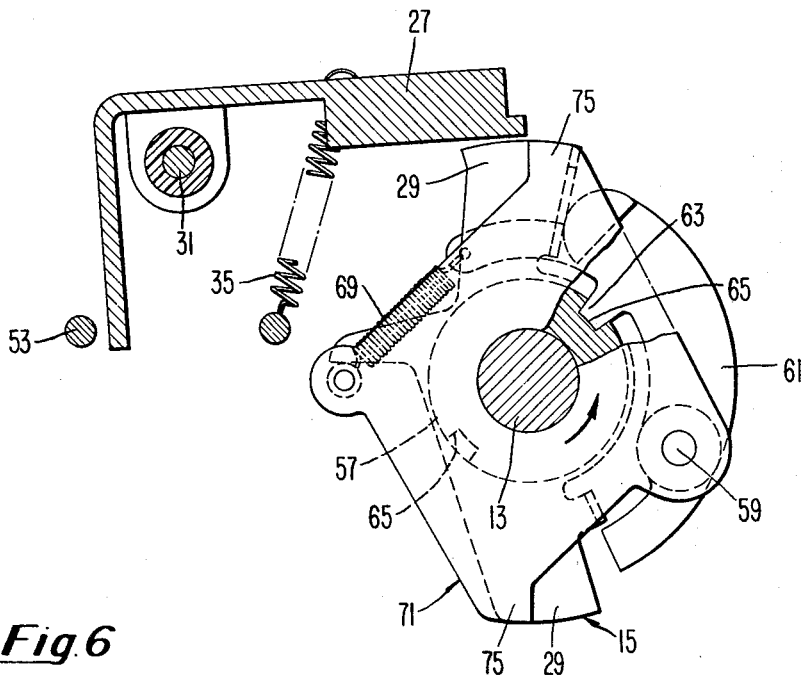
FIG. 6 is a sectional view taken along lines 6—6 of FIG. 3.

The clutch mechanism connects the driving means to the output power take-off means. The clutch mechanism including the clutch control cam 15 is thereby rotated clockwise in the same direction as the unlatching cam. More detailed operation of the clutch parts are shown in FIGS. 4, 5 and 6 and will be described later. Projection 29 will then be rotated beyond control of the latch. Spring 35 urges the mechanism back into the path of the projection when cam follower 39 reaches the decreasing radius on the unlatched cam.

Figure 7:
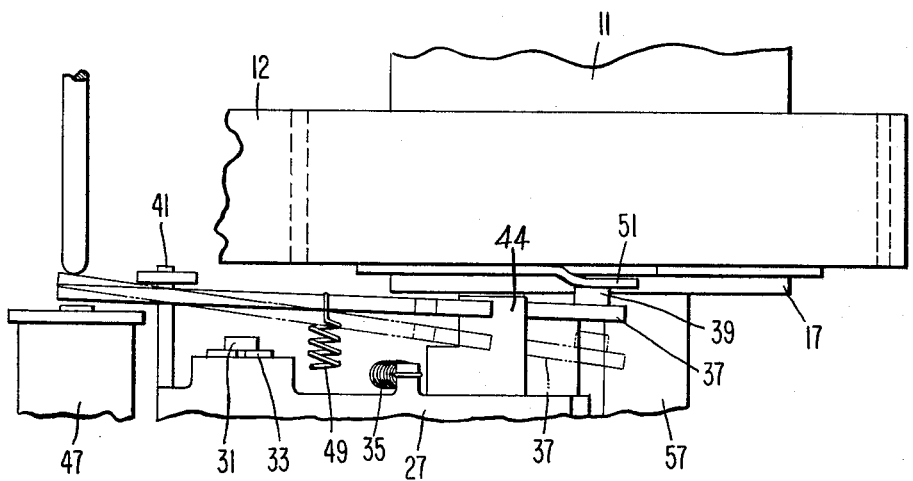
FIG. 7 is a detail top view of the face cam and the clapper arm of the unlatching mechanism.

If a single cycle is desired, the electromagnet is de-energized and face cam 51, see FIG. 7, along with spring 49 returns the clapper control arm 37 to normal. If continuous operation is desired, electromagnet 47 is continuously energized and the latching mechanism is removed from the path of the clutch control cam projection 29 on each succeeding cycle by the continuously rotating cam lobes 23.

Although the electromagnet could be used to directly lift the actuating mechanism, it is obvious that the electromagnet would have to be much larger to lift the entire mechanism than that required to merely pivot the clapper control arm 37. The unlatching motion is determined by the increased radius 21 of cam 17. Synchronism is readily obtained since the unlatching cam lifts the actuator mechanism out of the path of the clutching mechanism at the same degree each cycle thereby causing the clutch to take hold at the same time in each cycle.

Figure 2:
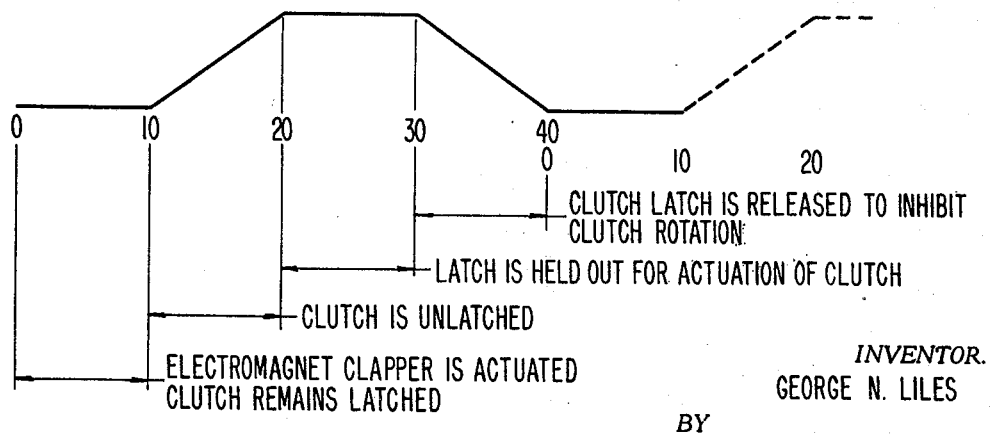
FIG. 2 is a timing cycle showing a typical use of the invention.

FIG. 2 shows a typical timing of the mechanism. The numbers used, 0–40, are not to be taken as degrees although they may be. From 0 to 40 may represent 360 degrees if a one revolution clutch is desired or, if a one-half revolution clutch is required, then 0 to 40 could represent 180 degrees. Any representation of the numbers is not to be taken as limiting applicant's device. Referring both to FIGS. 1 and 2, the operation is as follows: at the beginning of a complete cycle, the motive power such as solenoid 47 (FIG. 1) is energized at the time 0. During the time 0–10, the clapper arm 37 is allowed to be pulled into the electromagnet and the cam follower 39 on the other end of the arm is pivoted into the path of the unlatching cam surface 19. The time limitation on attracting the clapper arm 37 is very broad since the only requirement is that it be fully energized before 10. The engagement of the clutch does not depend upon the solenoid energization time as in prior art, thus the application of the solenoid control voltage is not critical. At 10, the increasing radius cam surface 21 begins to lift the cam follower. Since the cam follower 39 is part of the clapper control arm 37 and the control arm is attached to the actuator latch 27 at the pivot 41 and another point 43, the latching mechanism 25 will rotate clockwise about the latch pivot post 31. The latch is removed from the path of the projection 29 of the clutch control cam 15 and the clutching mechanism engages.

The electromagnet remains energized from 20–30 to hold the cam follower on the unlatching cam surface for a period sufficient to allow the clutch to fully engage. As will be explained later in FIG. 4, most clutches have a period between engagement and rotation during which time the mechanism could relatch without performing a rotation if the latch is not held for a sufficient period to allow for the drive member to start rotating the clutch away from the latch. This "dwell" period is also required if the clutch has a lead time after unlatching.

From 30–40 in the timing diagram, the solenoid is de-energized. Spring 49 along with the face cam surface 51 (shown in FIG. 7) removes the cam follower 39 from the unlatching cam surface. The latching mechanism is then pivoted by spring 35 into its normal position in the circular path of the projection 29 of the clutch control cam 15. The clutch will disengage when the projection 29 strikes the stop member 27.

Figure 3:
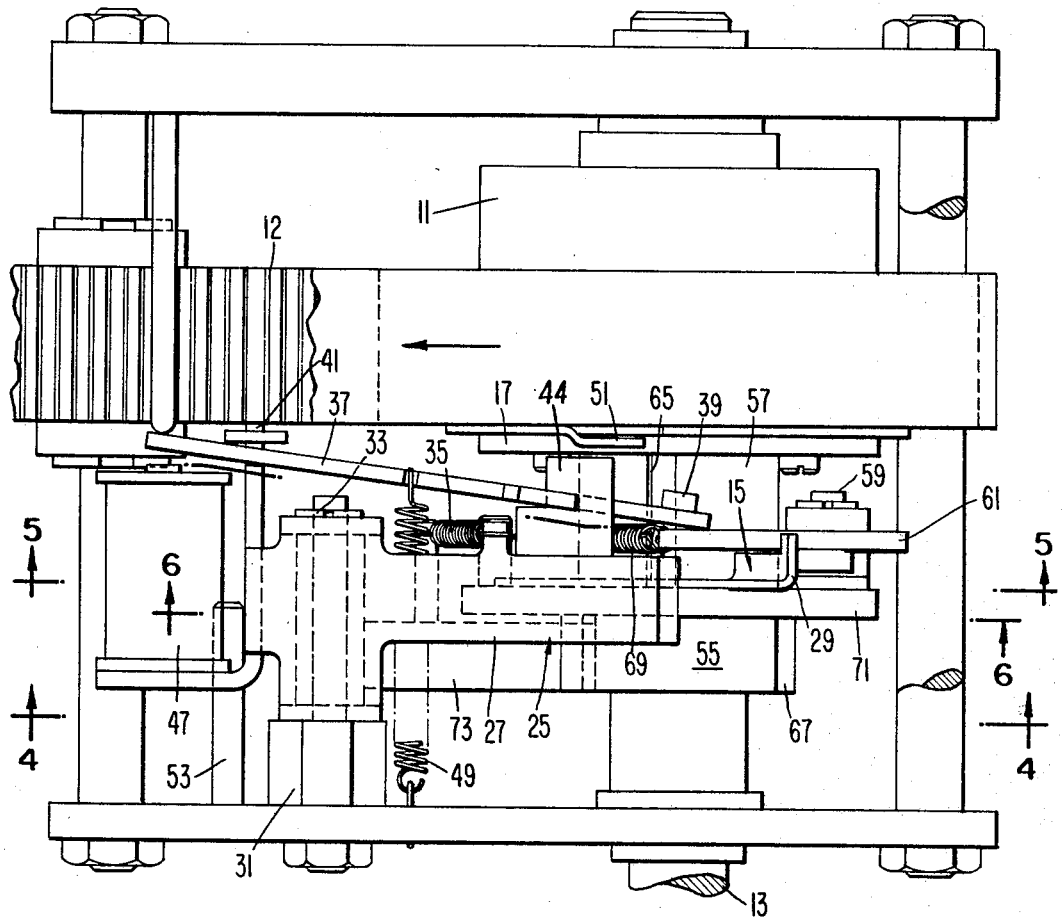
FIG. 3 is a top plan view of the latching mechanism of FIG. 1 in position with a complete clutch assembly.

The latching mechanism as applied to a clutch is shown in FIG. 3. The clutch is a conventional claw clutch shown generally as 55. The driving members of the clutch comprise cam 17 and member 57 and are fastened to the drive pulley 11. The drive members normally rotate on a bearing surface on shaft 13. Member 57 contains one part of the clutch mating means. In this embodiment, member 57 has at least one notch for mating with a detent carried by the clutching mechanism. The clutch mechanism is fastened to the shaft 13 by set screws. FIGS. 4, 5 and 6 show a detailed view of the clutch used in this embodiment.

Referring especially to FIG. 5, the latch mechanism with stop member 27 is shown in position for non-rotation. The clutching takes place when member 57, which is attached to and a part of timing pulley 11, has one of its notches 65 in contact the detent 63 of the clutch interlock 61. In a clutching operation, latching mechanism 25 is pivoted out of the path of the clutch mechanism by the action of solenoid 47 and arm 37 along with the unlatching cam 17 as heretofore described. When the stop arm 27 clears the projection 29, interlock 61 is pivoted downward about point 59 by the action of spring 69 camming the projection 29 of clutch control member 15 counter clockwise (as shown in FIG. 5). Member 57 is normally continually rotating as a part of the drive pulley. Detent 63 of the interlock 61 will be pulled into the notch 65 by the downward pivoting of interlock 61. Pulley member 57 through the notch and detent will cause interlock 61 to rotate and through the pivot point 59 cause the stop-plate 71 to rotate, see FIG. 4. Anti-backing cam 67 is made a part of the plate 71 and is fastened directly to the shaft 13. Shaft 13 will then rotate being driven by the pulley 11 until the stop member 27 is released into the path of the clutch control member 15.

The declutching can take place in the illustrated embodiment of the invention after a 180-degree rotation if desired or after many revolutions. Complete control over the clutch is held by the latching mechanism 25. The clutch will remain engaged until the solenoid 47 is de-energized and spring 49 removes the control arm 37 along with the cam follower 39 from the cam 17. Cam face knock-off 51, see FIG. 7, insures the removal of the cam follower from the cam at the precise time for proper declutching by forcing the clapper away from the electromagnet to interrupt any residual magnetism which might hold the clapper beyond the specified declutching time. FIG. 7 shows the face cam 51 removing the cam follower 39 from unlatching cam 17. Spring 49 urges the clapper arm 37 into its normal position shown in dotted lines in FIG. 7. The limit post limits the travel of arm 37. Complete control by the latching mechanism is thus assured. The latching mechanism 25 pivots back into the first control position in the path of the clutch control cam 15, see FIG. 4. Projection 29 strikes the stop arm 27 which in turn pivots the interlock 61 and detent 63 out of the notch 65 of driving member 57. Stop-plate projection 75 then strikes the stop arm 27 and stops the rotation of the shaft 13.

Striking the stop member 27 would normally cause the driven members, the output shaft and whatever is driven thereby, to rebound and revolve in a reverse direction. A reversing of the plate 71 will cause interlock 61 to pivot its detent 63 back into notch 65 and the clutch will attempt to engage again. Since stop arm 27 is still in the path of the clutch control member 15 and stop-plate 71, the clutch cannot completely engage but will engage sufficiently for the driving force to pivot the detent out of the notch. The members might rebound and repeat the process. Without any further control, the clutch would chatter until friction overcame the rebound. This chatter would cause wear and tear on the parts. In order to prevent this, an anti-backing cam 67 and a pawl 73 are provided along with plate 71. FIG. 4 in particular shows the parts comprising the anti-backup mechanism. Since the embodiment shows a 180-degree revolution clutch, pawl cam 67 has two lobes 79—79, 180 degrees apart. The operation of the mechanism is; when cam projection 75 strikes the actuator control member 27 on declutching, the pawl 73, following the anti-backing cam 67 due to the urging of spring 35, drops behind one of the lobes or sharp rises 79 of the anti-backing cam 67. Normal rotation from this view is counterclockwise. Plate 71 and cam 67 are fastened together. Stop-plate 71 is stopped from further counterclockwise rotation by the stop member 27 and the anti-backing cam is prevented from reverse or clockwise rotation by the pawl 73. The clutch mechanism as well as the output shaft will come to a stop without rebound.

Although applicant's actuating mechanism is shown with a particular clutch, it is obvious that a multitude of types of clutches may be used without departing from his invention.

Applicant has provided a small, simple latching mechanism requiring few parts. Applicant has also provided a means for obtaining a synchronized clutching operation without sacrificing reliability. Although the description referred to a detent clutch, it is obvious that many types of clutches could be used as well as any other operation which requires a selectively operated, precisely controlled latching mechanism. It should be noted that the scope of this invention includes various changes and modifications that are within the skill of those familiar with the art, the scope of the invention being limited only by the following claims.

I claim:

1. Apparatus for coupling a rotating driving means to an output shaft comprising:
    a selectively operable clutch having a clutch control means which rotates unless latched,
    a pivoted latch operable into and out of the path of said clutch control means for respectively disengaging and engaging said clutch,
    a camming means continuously rotated by said driving means, and
    a low inertia lever having a cam follower at one end and having first and second points of contact with said latch, being pivotally mounted thereon at said first point of contact and having said one end slidably engaged therewith at said second point of contact for selective movement of said cam follower into and out of the path of said camming means, and for pivoting said latch, respectively, whereby the rotation of said driving means pivots said latch when said cam follower is engaged with said camming means.

2. The apparatus of claim 1 wherein said latch is pivoted between its ends, one end of said latch including a projection extending laterally across and engaging a notch in said lever and said mechanism having means for biasing said end into engagement with said clutch control means and the other end of said latch including a counterbalance for minimizing the unlatching force required to pivot said latch.

3. The apparatus of claim 2 wherein said latch counterbalance includes a solenoid for pivoting said lever as the armature of the solenoid.

4. In a clutch having a rotating driving member, a clutch control mechanism comprising:
    camming means rotated by said driving member,
    a latch pivoted between its ends with a longer operating end having a first position under bias and a second position against bias for respectively disengaging and engaging said clutch, a solenoid mounted on the shorter end of, and counterbalancing, said latch, and a low inertia planar lever acting as the armature of said solenoid and having a cam follower on one end, said one end being juxtaposed to and operatively connected with said operating end of said latch, said lever being fulcrumed on said latch adjacent said armature for selective movement in one direction for positioning said cam follower into the path of said camming means and for movement in another direction under the camming action of said cam for directly pivoting said latch from said first position to said second position and thereby engaging said clutch.

References Cited

UNITED STATES PATENTS

| | | | |
|---|---|---|---|
| 411,401 | 9/1889 | Uhlinger | 192—28 XR |
| 1,765,527 | 6/1930 | Gollnick et al. | 192—28 |
| 2,171,467 | 8/1939 | Zeruneith. | |
| 3,092,226 | 6/1963 | Williamson | 192—28 XR |
| 3,173,392 | 3/1965 | Hedegaard | 192—28 XR |
| 3,206,212 | 9/1965 | Wallace et al. | 192—22 XR |

BENJAMIN W. WYCHE III, Primary Examiner

U.S. Cl. X.R.

192—33